United States Patent
Shino et al.

(10) Patent No.: US 7,305,214 B2
(45) Date of Patent: Dec. 4, 2007

(54) RECEIVED RESPONSE CHARACTERISTICS STORING METHOD AND RADIO APPARATUS UTILIZING THE SAME

(75) Inventors: Hideaki Shino, Tokyo (JP); Yoshiharu Doi, Gifu (JP); Seiji Matsui, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 577 days.

(21) Appl. No.: 10/740,713

(22) Filed: Dec. 22, 2003

(65) Prior Publication Data

US 2004/0132430 A1 Jul. 8, 2004

(30) Foreign Application Priority Data

Dec. 27, 2002 (JP) ............... 2002-379837

(51) Int. Cl.
*H04B 17/00* (2006.01)
(52) U.S. Cl. .................. 455/67.11; 455/562.1
(58) Field of Classification Search ............ 455/562.1, 455/67.11, 69; 375/343; 370/334
See application file for complete search history.

(56) References Cited

U.S. PATENT DOCUMENTS 6,754,473 B1 * 6/2004 Choi et al. ................. 455/101

FOREIGN PATENT DOCUMENTS

| JP | 11-8566 | 1/1999 |
|---|---|---|
| JP | 2000-40988 | 2/2000 |
| JP | 2000-332666 | 11/2000 |
| JP | P2000-332666 A | 11/2000 |
| JP | 2001-298388 | 10/2001 |
| JP | 2002-171214 | 6/2002 |
| JP | 2002-232334 | 8/2002 |

OTHER PUBLICATIONS

Chinese Office Action for Corresponding Chinese Patent Application No. 200310124247.6, Issue Date: Mar. 10, 2006.
Japanese Office Action issued in corresponding Japanese Patent Application No. JP 2002-379837, dated Aug. 22, 2006.
Japanese Office Action issued in Japanese Patent Application No. JP 2002-379837, dated May 15, 2007.

* cited by examiner

*Primary Examiner*—Lee Nguyen
(74) *Attorney, Agent, or Firm*—McDermott Will & Emery LLP

(57) ABSTRACT

Radio frequency signals are transmission-receiving processed by N antennas. A radio unit performs a frequency translation processing, an amplification processing and an A-D or D-A conversion processing between a baseband signal and the radio frequency signal. A signal processing unit performs a signal processing necessary for the transmission/receiving processing by adaptive antennas. A modem unit performs modulation/demodulation processings. A baseband unit serves as interface with a network. A storage period deciding unit determines storage period for a received response vector estimated by the signal processing unit. A control unit controls timings and the like of the radio unit, the signal processing unit, the modem unit and the baseband unit.

18 Claims, 18 Drawing Sheets

FIG.12

| LINE | MOVEMENT VELOCITY | STORAGE PERIOD |
|---|---|---|
| 1 | $0 \leq V_{PS} < 5$ | 10 |
| 2 | $5 \leq V_{PS} < 10$ | 8 |
| 3 | $10 \leq V_{PS} < 15$ | 6 |
| 4 | $15 \leq V_{PS} < 20$ | 4 |
| 5 | $20 \leq V_{PS} < 25$ | 2 |
| 6 | $25 \leq V_{PS} < 30$ | 1 |
| 7 | $30 \leq V_{PS} < 35$ | 0.5 |
| 8 | $35 \leq V_{PS}$ | 0.1 |

FIG.14

| PSID | MOVEMENT VELOCITY | STORAGE PERIOD | RECEIVED WEIGHT VECTOR |
|---|---|---|---|
| 222 | 17 | t10+4 | (0.35, -0.20) (0.17, 0.08) ... (-0.20, 0.15) |
| 020 | 30 | t9+0.5 | (0.05, 0.03) (-0.75, -0.68) ... (0.11, -0.08) |
| 062 | 41 | t8+0.1 | (0.17, 0.18) (0.21, 0.45) ... (-0.68, 0.12) |
| 199 | 33 | t7+0.5 | (0.44, -0.20) (-0.33, 0.38) ... (0.10, -0.66) |
| 115 | 14 | t6+6 | (0.28, -0.31) (0.56, 0.42) ... (0.06, 0.11) |
| 037 | 20 | t5+2 | (0.62, 0.48) (-0.43, 0.22) ... (-0.41, -0.05) |
| 108 | 22 | t4+2 | (-0.32, 0.18) (0.24, -0.16) ... (-0.10, 0.52) |
| 182 | 26 | t3+1 | (-0.54, -0.11) (0.27, 0.22) ... (-0.15, 0.82) |
| 204 | 12 | t2+6 | (0.12, 0.36) (-0.17, 0.72) ... (0.51, 0.47) |
| 001 | 6 | t1+8 | (-0.59, -0.08) (0.38, 0.12) ... (-0.05, 0.42) |

FIG.16

| LINE | MOVEMENT VELOCITY | RECEIVED POWER | STORAGE PERIOD |
|---|---|---|---|
| 1 | $0 \leq V_{PS} < 5$ | STRONG | 11 |
| 1 | $0 \leq V_{PS} < 5$ | MIDDLE | 10 |
| 1 | $0 \leq V_{PS} < 5$ | WEAK | 9.5 |
| 2 | $5 \leq V_{PS} < 10$ | STRONG | 9 |
| 2 | $5 \leq V_{PS} < 10$ | MIDDLE | 8 |
| 2 | $5 \leq V_{PS} < 10$ | WEAK | 7.5 |
| 3 | $10 \leq V_{PS} < 15$ | STRONG | 7 |
| 3 | $10 \leq V_{PS} < 15$ | MIDDLE | 6 |
| 3 | $10 \leq V_{PS} < 15$ | WEAK | 5.5 |
| 4 | $15 \leq V_{PS} < 20$ | STRONG | 5 |
| 4 | $15 \leq V_{PS} < 20$ | MIDDLE | 4 |
| 4 | $15 \leq V_{PS} < 20$ | WEAK | 4.5 |
| 5 | $20 \leq V_{PS} < 25$ | STRONG | 3 |
| 5 | $20 \leq V_{PS} < 25$ | MIDDLE | 2 |
| 5 | $20 \leq V_{PS} < 25$ | WEAK | 1.5 |
| 6 | $25 \leq V_{PS} < 30$ | STRONG | 1.2 |
| 6 | $25 \leq V_{PS} < 30$ | MIDDLE | 1 |
| 6 | $25 \leq V_{PS} < 30$ | WEAK | 0.8 |
| 7 | $30 \leq V_{PS} < 35$ | STRONG | 0.7 |
| 7 | $30 \leq V_{PS} < 35$ | MIDDLE | 0.5 |
| 7 | $30 \leq V_{PS} < 35$ | WEAK | 0.3 |
| 8 | $35 \leq V_{PS}$ | STRONG | 0.2 |
| 8 | $35 \leq V_{PS}$ | MIDDLE | 0.1 |
| 8 | $35 \leq V_{PS}$ | WEAK | 0.05 |

| LINE | USAGE RATE | STORAGE PERIOD |
|---|---|---|
| 1 | TR<20 | 1200 |
| 2 | 20≦TR<40 | 600 |
| 3 | 40≦TR<60 | 60 |
| 4 | 60≦TR<80 | 5 |
| 5 | 80≦TR | 1 |

RECEIVED RESPONSE CHARACTERISTICS STORING METHOD AND RADIO APPARATUS UTILIZING THE SAME

BACKGROUND OF THE INVENTION

1. Field of the Invention

The present invention relates to the technology for storing the received response characteristics as well as the wireless technology utilizing the same, and it particularly relates to received response characteristics storing method and radio apparatus utilizing the same for determining the period during which the received response characteristics are retained.

2. Description of the Related Art

In wireless communication, it is generally desired that the limited frequency resources be used effectively. In an effective use of frequency resources, radio waves of the same frequencies are, for example, often used as repeatedly as possible in the short range. In such a case, however, communication quality deteriorates in the presence of cochannel interference from a nearby radio base station or wireless mobile station using the same frequency. One of the technologies for preventing the degradation of communication quality due to cochannel interferences is the adaptive array antenna technology.

Generally in the adaptive array antenna technology, signals received by a plurality of antennas are synthesized in the receiving processing by weighting them with their respective received weight vectors. Further, in the transmission processing, signals to be transmitted are separated by weighting them with transmission weight vectors and then transmitted from a plurality of antennas. In a series of processings, received weight vectors are estimated from a plurality of received signals and then transmission weight vectors are estimated from the received weight vectors, so that the received weight vectors estimated in the receiving processing are stored in a storing medium, such as a memory, until they are subjected to a transmission processing (see the Related Art List (1)).

Related Art List (1) Japanese Patent Application Laid-Open No. 2000-332666.

Where a radio base station apparatus having adaptive array antennas is connected to a plurality of terminals by multiple access technology, such as TDMA (Time Division Multiple Access), it is sufficient to store applicable received weight vectors until a known transmission processing timing. On the other hand, where a radio base station is connected to a plurality of terminals by CSMA (Carrier Sense Multiple Access), the period of time during which the received weight vectors are to be stored is generally unknown because the transmission processing timing is unknown.

SUMMARY OF THE INVENTION

The present invention has been made in view of the foregoing circumstances and an object thereof is to provide a received response characteristics storing method by which received response characteristics including received weight vectors are stored and a radio apparatus utilizing the same. Another object thereof is to provide a received response characteristics storing method by which the storage period of received response characteristics including received weight vectors is determined and a radio apparatus utilizing it. Still another object thereof is to provide a received response characteristics storing method by which the storage period of received weight vectors to be used for the estimation of transmission weight vectors is determined and a radio apparatus utilizing it.

A preferred embodiment according to the present invention relates to a method of storing received response characteristics. This method includes: inputting a received signal from a terminal apparatus; estimating from the inputted received signal a received response characteristic of the terminal apparatus; estimating from the inputted received signal, the degree of change in a propagation environment between the terminal apparatus and a radio apparatus, and determining a storage period of the thus estimated received response characteristic according to the estimated degree of change; and storing the thus estimated received response characteristic for the determined storage period.

The "response characteristic" includes the response characteristic which is transformed based on a predetermined rule such as complex conjugation or linear transformation, and further includes a weighting factor such as a weight The estimating and determining may be such that movement velocity of the terminal apparatus is estimated, from the inputted received signal, as estimating the degree of change in a propagation environment. Moreover, the estimating and determining may be such that a Doppler frequency contained in the received signal is estimated, from the inputted received signal, as estimating the degree of change in a propagation environment. Moreover, the estimating and determining may further include estimating electric power of the inputted received signal wherein the storage period for the substantially same degree of change is made longer as the electric power becomes larger.

The "degree of change in a propagation environment" includes the magnitude in the amplitude direction such as that of a received power or an amplitude, and the magnitude in the time direction such as a change rate.

By implementing the above methods, the storage period of the received response characteristics can be made shorter when the degree of change in a propagation environment is high whereas the storage period thereof can be made longer when the degree thereof is low. Thus, the received response characteristics, if any, which greatly differ from the actual propagation environment can be deleted immediately.

Another preferred embodiment according to the present invention relates to a program. This program includes the functions of: inputting a received signal from a terminal apparatus; estimating, from the inputted received signal, a received response characteristic of the terminal apparatus; estimating from the inputted received signal, the degree of change in a propagation environment between the terminal apparatus and a radio apparatus, and determining a storage period of the thus estimated received response characteristic according to the estimated degree of change; and storing the thus estimated received response characteristic for the determined storage period.

The estimating and determining may be such that movement velocity of the terminal apparatus is estimated, from the inputted received signal, as estimating the degree of change in a propagation environment. Moreover, the estimating and determining may be such that a Doppler frequency contained in the received signal is estimated, from the inputted received signal, as estimating the degree of change in a propagation environment. Moreover, the estimating and determining may further include estimating electric power of the inputted received signal wherein the storage period for the substantially same degree of change is made longer as the electric power becomes larger.

Still another preferred embodiment according to the present invention relates to a radio apparatus. This apparatus includes: an input unit which inputs a received signal from a terminal apparatus; a received response characteristics estimating unit which estimates from the inputted received signal a received response characteristic of the terminal apparatus; a storage period determining unit which estimates from the inputted received signal, the degree of change in a propagation environment between the terminal apparatus and a radio apparatus, and determines a storage period of the thus estimated received response characteristic according to the estimated degree of change; a received response characteristics storage unit which stores the thus estimated received response characteristics for the determined storage period; a transmission response characteristics estimating unit which estimates a transmission response characteristic from the received response characteristic stored by the received response characteristic storage unit; and an output unit which operates a signal to be transmitted to the terminal apparatus on the transmission response characteristic estimated by the transmission response characteristics estimating unit, so as to be outputted.

The storage period determining unit may estimate movement velocity of the terminal apparatus from the inputted received signal, as estimating the degree of change in a propagation environment. Moreover, the storage period determining unit may estimate, from the inputted received signal, a Doppler frequency contained in the received signal as estimating the degree of change in a propagation environment. Moreover, the storage period determining unit may further estimate electric power of the inputted received signal and determine in a manner such that the storage period for the substantially same degree of change is made longer as the electric power becomes larger.

Still another preferred embodiment according to the present invention relates also to a method of storing received response characteristics. This method includes: inputting a received signal from a terminal apparatus; estimating from the inputted received signal a received response characteristic of the terminal apparatus; determining a storage period of the thus estimated received response characteristic according to the size of free area in a memory to which the received response characteristic is to be recorded; and storing the thus determined storage period and the estimated received response characteristic in the memory.

Still another preferred embodiment according to the present invention relates to a program. This program includes the functions of: inputting a received signal from a terminal apparatus; estimating from the inputted received signal a received response characteristic of the terminal apparatus; determining a storage period of the thus estimated received response characteristic according to the size of free area in a memory to which the received response characteristic is to be recorded; and storing the thus determined storage period and the estimated received response characteristic in the memory.

Still another preferred embodiment according to the present invention relates also to a radio apparatus. This apparatus includes: an input unit which inputs a received signal from a terminal apparatus; a received response characteristics estimating unit which estimates from the inputted received signal a received response characteristic of the terminal apparatus; a storage period determining unit which determines a storage period of the thus estimated received response characteristic according to the size of free area in a memory to which the received response characteristic is to be recorded; a received response characteristics storage unit which stores the thus estimated received response characteristics for the determined storage period; a transmission response characteristics estimating unit which estimates a transmission response characteristic from the received response characteristic stored by the received response characteristic storage unit; and an output unit which operates a signal to be transmitted to the terminal apparatus on the transmission response characteristic estimated by the transmission response characteristics estimating unit, so as to be outputted.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 12 shows a correspondence relationship between movement velocities and storage periods at the conversion unit shown in FIG. 11.

FIG. 14 shows storage contents of the storage period deciding unit shown in FIG. 7.

FIG. 16 shows a correspondence relationship between movement velocities, received powers and storage periods at the conversion unit shown in FIG. 15.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

A first embodiment of the present invention relates to a radio apparatus at a base station which is connected to a plurality of terminals by CSMA and is equipped with an adaptive array antenna. In a receiving processing, the radio apparatus estimates from a plurality of received signals the received weight vectors by which to weight the received signals and stores the received weight vectors in memory for a predetermined period of time. In a transmission processing, the radio apparatus estimates from the thus stored received weight vectors the transmission weight vectors by which to weight the signals to be transmitted. The radio apparatus or wireless apparatus according to the present embodiment estimates a Doppler frequency contained in received signals in order to determine the storage period of the received weight vectors. To be more specific, the higher the Doppler frequency, the shorter the storage period must be set, and the lower the Doppler frequency, the longer the storage period must be set. In other words, the Doppler frequency reflects the degree of change in the propagation environment that exists between a radio apparatus and a terminal apparatus, including the movement of the terminal apparatus. And when the Doppler frequency is high, the value of a received weight vector considered optimal changes more quickly, so that a longer storage period therefor does not generally prove adequate for the actual propagation environment. On the other hand, when the Doppler frequency is low, the received weight vectors can be stored for a longer period as effective received weight vectors.

Figure 1:
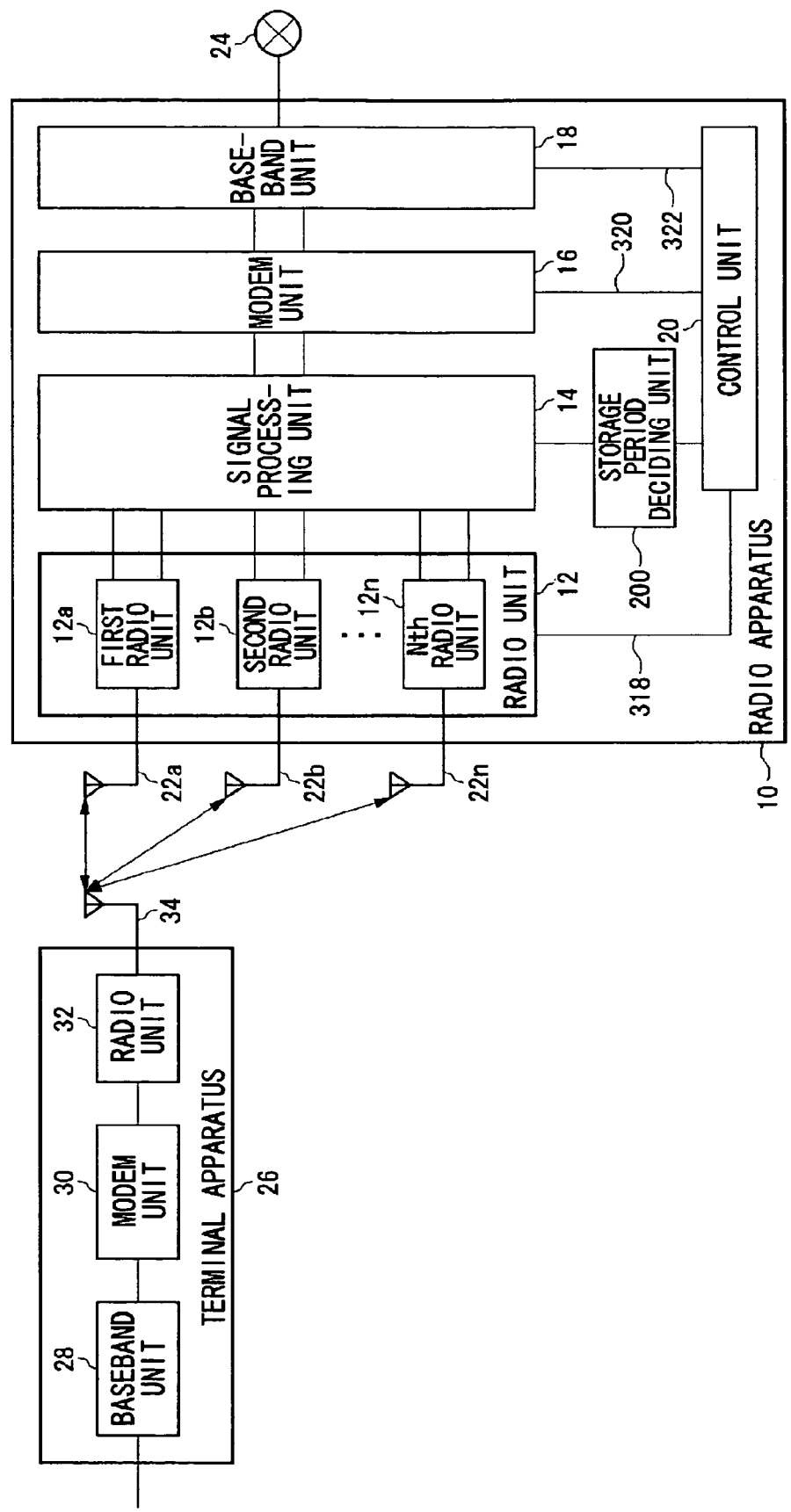
FIG. 1 shows a communication system according to a first embodiment of the present invention.

FIG. 1 shows a communication system, which comprises a radio apparatus 10 and a terminal apparatus 26, according to the first embodiment. The radio apparatus 10 includes a first antenna 22a, a second antenna 22b, . . . and an N-th antenna 22n, which are generically called antennas 22, a radio unit 12, a signal processing unit 14, a modem unit 16, a baseband unit 18, a control unit 20 and a storage period deciding unit 200, and is connected to a network 24. The radio unit 12 includes a first radio unit 12a, a second radio unit 12b, . . . and an N-th radio unit 12n. The terminal apparatus 16 includes an antenna 34, a radio unit 32, a modem unit 30 and a baseband unit 28. Moreover, the radio apparatus 10 includes a radio unit control signal 318, a modem unit control signal 320 and a baseband unit control signal 322 as signals. In the communication system shown in FIG. 1, a single terminal apparatus 26 is connected to the radio apparatus 10, but a plurality of terminal apparatuses 26 may be connected thereto.

The baseband unit 18 in the radio apparatus 10 is an interface with the network 24, and the baseband unit 28 in the terminal apparatus 26 is an interface with a PC connected to the terminal apparatus 26 or with an application within the terminal apparatus 26. They perform transmission and receiving processings of information signals to be transmitted/received by the communication system. They can also perform error correction or automatic retransmission processing, but the description of such processings is omitted here.

The modem unit 16 in the radio apparatus 10 and the modem unit 30 in the terminal apparatus 26 carry out modulation processing in which transmission signals are generated by modulating information signals to be transmitted. They also carry out demodulation processing in which information signals transmitted are reproduced by demodulating the carrier into received signals.

The signal processing unit 14 performs signal processing that includes the estimation of received response vectors necessary for transmission/receiving processing by an adaptive array antenna.

The storage period deciding unit 200 decides the storage period for received response vectors estimated by the signal processing unit 14.

The radio units 12a to 12c in the radio apparatus 10 and the radio unit 32 in the terminal apparatus 26 carry out frequency translation processing, amplification processing, A-D or D-A conversion processing and the like between the baseband signals and radio frequency signals, which are processed by the signal processing unit 14, the modem unit 16, the baseband unit 18, the baseband unit 28 and the modem unit 30.

The antenna 22 of the radio apparatus 10 and the antenna 34 of the terminal apparatus 26 perform transmission/receiving processings of signals of radio frequencies. The directivity of the antennas may be arbitrary and the number of the antenna 22 may be N.

The control unit 20 controls timings for the radio unit 12, the signal processing unit 14, the modem unit 16 and the baseband unit 18.

Figure 2:
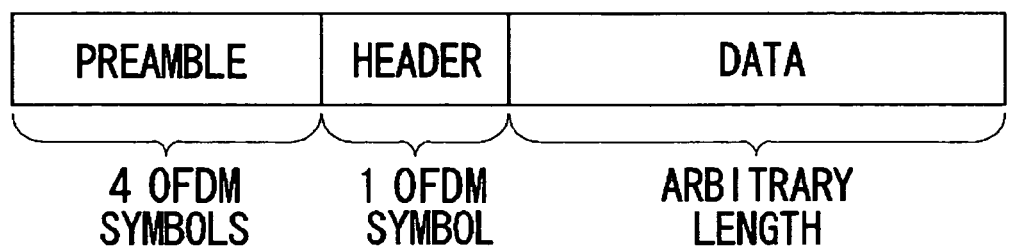
FIG. 2 shows a burst format according to the first embodiment of the present invention.
Figure 3:
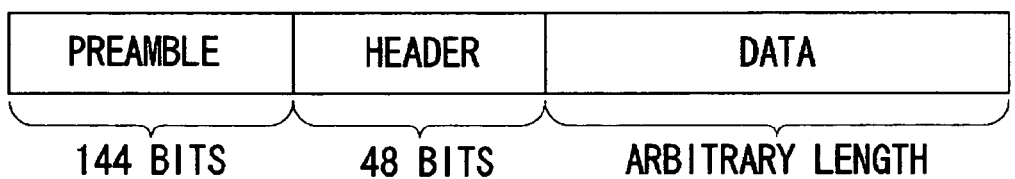
FIG. 3 shows another burst format according to the first embodiment of the present invention.

FIGS. 2 and 3 show different burst formats which are used in CSMA communication systems, such as represented by a communication system shown in FIG. 1. The one shown in FIG. 2 is a burst format used in IEEE802.11a, which is a standard for wireless LAN (Local Area Network). IEEE802.11a uses OFDM (Orthogonal Frequency Division Multiplexing) modulation techniques, which generally regard the total of the size of Fourier transform and the number of symbols of guard intervals as one unit. This one unit is treated as an OFDM symbol according to the present embodiment. A preamble is placed in the four leading OFDM symbols of the burst, which is mainly used for timing synchronization and carrier recovery. Since the signals of the preamble are known signals for the radio apparatus 10 and the terminal apparatus 26, the preamble can be used as a training signal.

FIG. 3 shows a burst format that is used in IEEE802.11b, which is a standard for wireless LAN. A preamble is placed in the first 144 bits of the burst, and a header is placed in the subsequent 48 bits thereof. The preamble, which is known to the radio apparatus 10 and the terminal apparatus 26, can also be used as a training signal, which will be described later.

Figure 4:
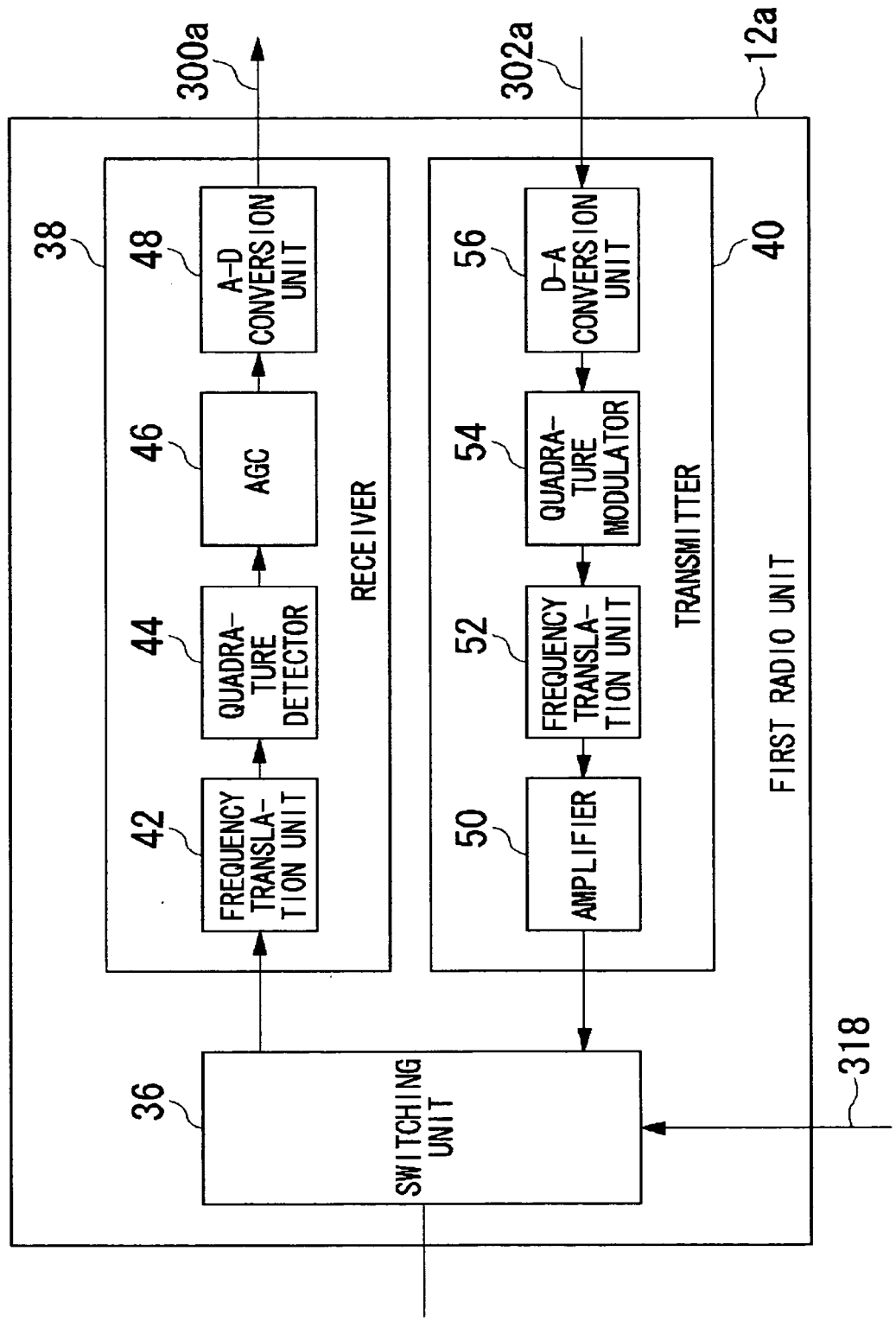
FIG. 4 shows a structure of the first radio unit shown in FIG. 1.
Figure 5:
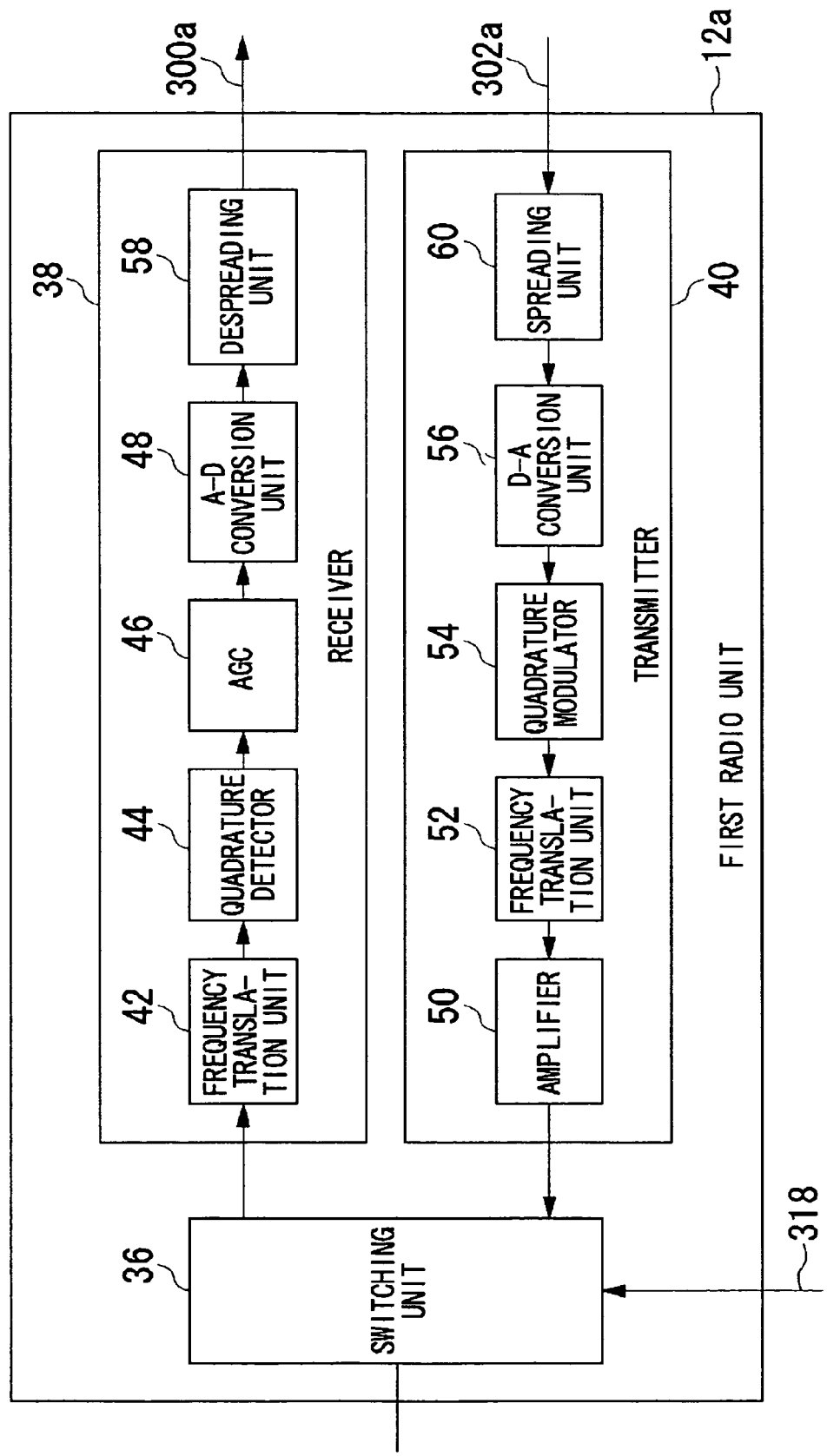
FIG. 5 shows another structure of the first radio unit shown in FIG. 1.
Figure 6:
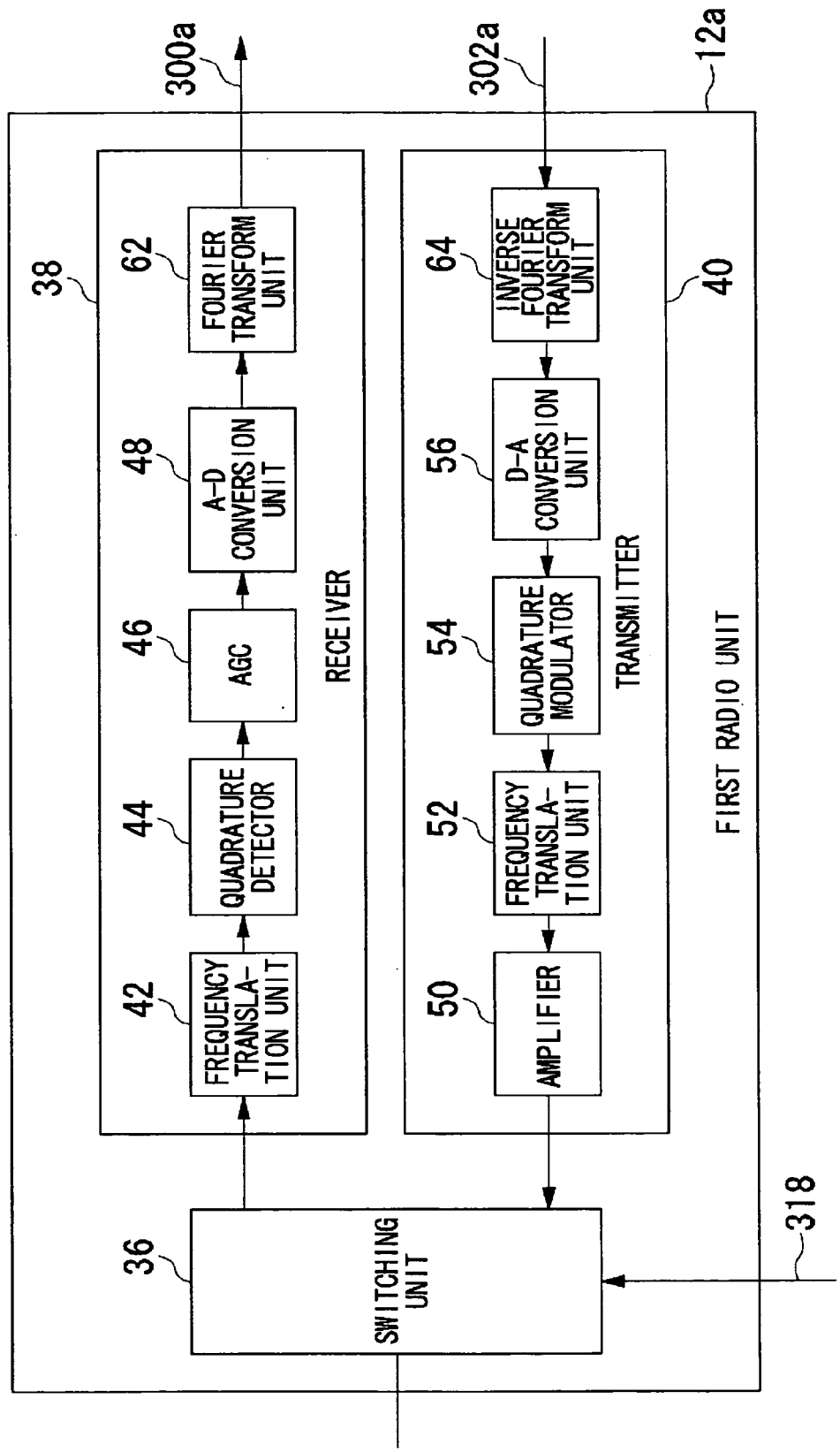
FIG. 6 shows still another structure of the first radio unit shown in FIG. 1.

FIGS. 4 to 6 show different structures of a first radio unit 12a corresponding to different communication systems. Normally, differences between different communication systems are absorbed by the first radio unit 12a in the radio apparatus 10, so that the signal processing unit 14 positioned subsequent thereto can operate without being conscious of their differences. The first radio unit 12a as shown in FIG. 4, which may be compatible with single carrier communication systems such as a personal handy phone system as shown in FIG. 2 or other mobile phone systems, includes a switching unit 36, a receiver 38 and a transmitter 40.

Furthermore, the receiver 38 includes a frequency translation unit 42, an quadrature detector 44, an AGC (automatic gain control) 46 and an A-D conversion unit 48, whereas the transmitter 40 includes an amplifier 50, a frequency translation unit 52, an quadrature modulator 54 and a D-A conversion unit 56.

Moreover, signals include a first digital received signal 300*a*, which is generically named a digital received signal 300, and a first digital transmission signal 302*a*, which is generically named a digital transmission signal 302. The first radio unit 12*a* as shown in FIG. 5, which may be compatible with spectrum spreading communication systems, such as W-CDMA (Wideband-Code Division Multiple Access) or wireless LANs complying with IEEE802.11b, is added with an despreading unit 58 and a spreading unit 60. The first radio unit 12*a* as shown in FIG. 6, which may be compatible with multicarrier communication systems, such as wireless LANs complying with IEEE802.11a or HiperLAN/2, is added with a Fourier transform unit 62 and an inverse Fourier transform unit 64.

The switching unit 36 switches input and output of signals to the receiver 38 and the transmitter 40 according to the instructions from the control unit 20.

The frequency translation unit 42 in the receiver 38 and the frequency translation unit 52 in the transmitter 40 perform frequency translation between signals of radio frequencies and signals of one or more intermediate frequencies.

The quadrature detector 44 generates baseband analog signals from intermediate frequency signals through quadrature detection. On the other hand, the quadrature modulator 54 generates intermediate frequency signals from baseband analog signals through quadrature modulationr.

The AGC 46 controls gain automatically to make the amplitude of baseband analog signals an amplitude within the dynamic range of the A-D conversion unit 48.

The A-D conversion unit 48 converts baseband analog signals into digital signals, and the D-A conversion unit 56 converts baseband digital signals into analog signals. Hereinbelow, the digital signals outputted from the A-D conversion unit 48 are called digital received signal 300, and the digital signals inputted to the D-A conversion unit 56 are called digital transmission signal 302.

The amplifier 50 amplifies radio frequency signals to be transmitted.

The spreading unit 60 and the despreading unit 58 both shown in FIG. 5 perform correlation processing of digital transmission signals 302 and digital received signals 300, respectively, by a predetermined spreading code sequence. The inverse Fourier transform unit 64 and the Fourier transform unit 62 both shown in FIG. 6 perform the inverse Fourier transform processing of digital transmission signals 302 and the Fourier transform processing of digital received signals 300, respectively.

Figure 7:
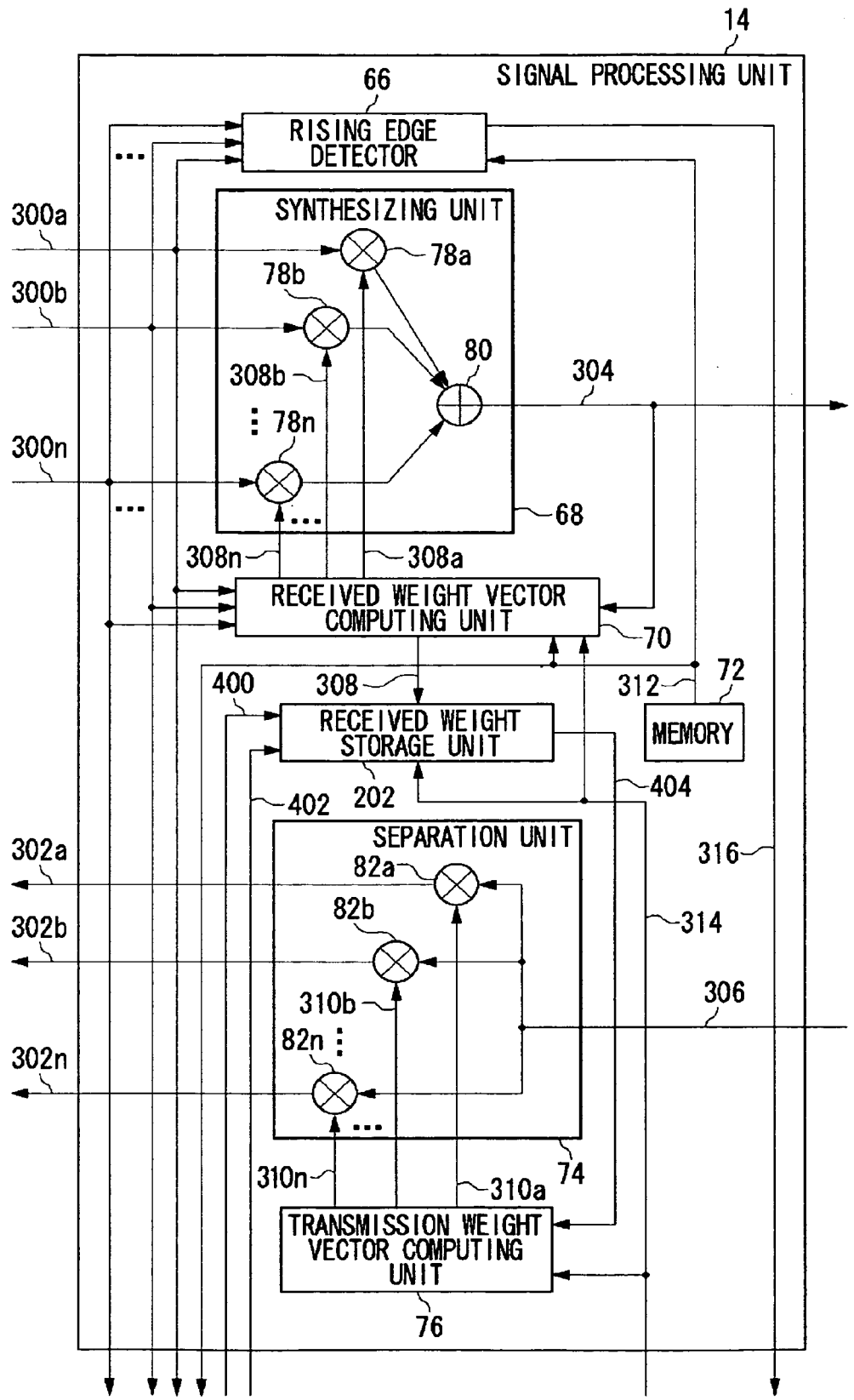
FIG. 7 shows a structure of the signal processing unit shown in FIG. 1.

FIG. 7 shows a structure of a signal processing unit 14. The signal processing unit 14 includes a rising edge detector 66, a memory 72, a received weight vector computing unit 70, a synthesizing unit 68, a received weight storage unit 202, a transmission weight vector computing unit 76 and a separation unit 74. Further, the synthesizing unit 68 includes a first multiplication unit 78*a*, a second multiplication unit 78*b*, . . . and an N-th multiplication unit 78*n*, which are generically named a multiplication unit 78, and an addition unit 80, and the separating unit 74 includes a first multiplication unit 82*a*, a second multiplication unit 82*b*, . . . and an N-th multiplication unit 82*n*, which are generically named multiplication units 82.

Moreover, the signals used include a synthesized signal 304, a pre-separation signal 306, a first received weight vector 308*a*, a second received weight vector 308*b*, . . . and an N-th received weight vector 308*n*, which are generically named received weight vectors 308, a first transmission weight vector 310*a*, a second transmission weight vector 310*b*, . . . and an N-th transmission weight vector 310*n*, which are generically named transmission weight vectors 310, a training signal 312, an input control signal 314, an output control signal 316, a storage period indicating signal 400, a movement velocity signal 402 and stored received weight vectors 404.

The rising edge detector 66 detects from a digital received signal 300 the head of a burst signal that triggers the operation of a radio apparatus 10. The detection timing of the head of the burst signal is conveyed to the control unit 20 by the output control signal 316. Furthermore, the control unit 20 notifies each unit of various timing signals, generated from this timing, which are necessary for control.

The memory 72 stores the training signal 312 and outputs it as necessary.

The received weight vector computing unit 70 computes received weight vectors 308 necessary for weighting digital received signals 300 from the digital received signals 300, synthesized signal 304 and training signal 312 during a training, using an adaptive algorithm, such as RLS (Recursive Least Squares) algorithm or LMS (Least Mean Squares) algorithm. Similarly, the received weight vector computing unit 70 computes received weight vectors 308 for weighting digital received signals 300 from the digital received signals 300 and synthesized signal 304 after the training, using the adaptive algorithm.

The synthesizing unit 68 weights the digital received signals 300 by the received weight vectors 308 at the multiplication units 78, then adds them up by the addition unit 80 and outputs a synthesized signal 304.

The received weight storage unit 202 stores the received weight vectors 308 for a period indicated by the storage period indicating signal 400 and outputs them as stored received weight vectors 404 for transmission processing.

The transmission weight vector computing unit 76 estimates transmission weight vectors 310 necessary for weighting pre-separation signals 306 from the stored received weight vectors 404, which are received response characteristics. The method for estimating the transmission weight vectors 310 is arbitrary, but in an easiest method, the stored received weight vectors 404 may be used as they are. Alternatively, the stored received weight vectors 404 may be corrected, using a conventional technique, with consideration given to the change in Doppler frequency in the propagation environment that may result from time difference between receiving processing and transmission processing.

The separation unit 74 weights the pre-separation signal 306 with the transmission weight vectors 310 at the multiplication units 82 and outputs a digital transmission signal 302.

Figure 8:
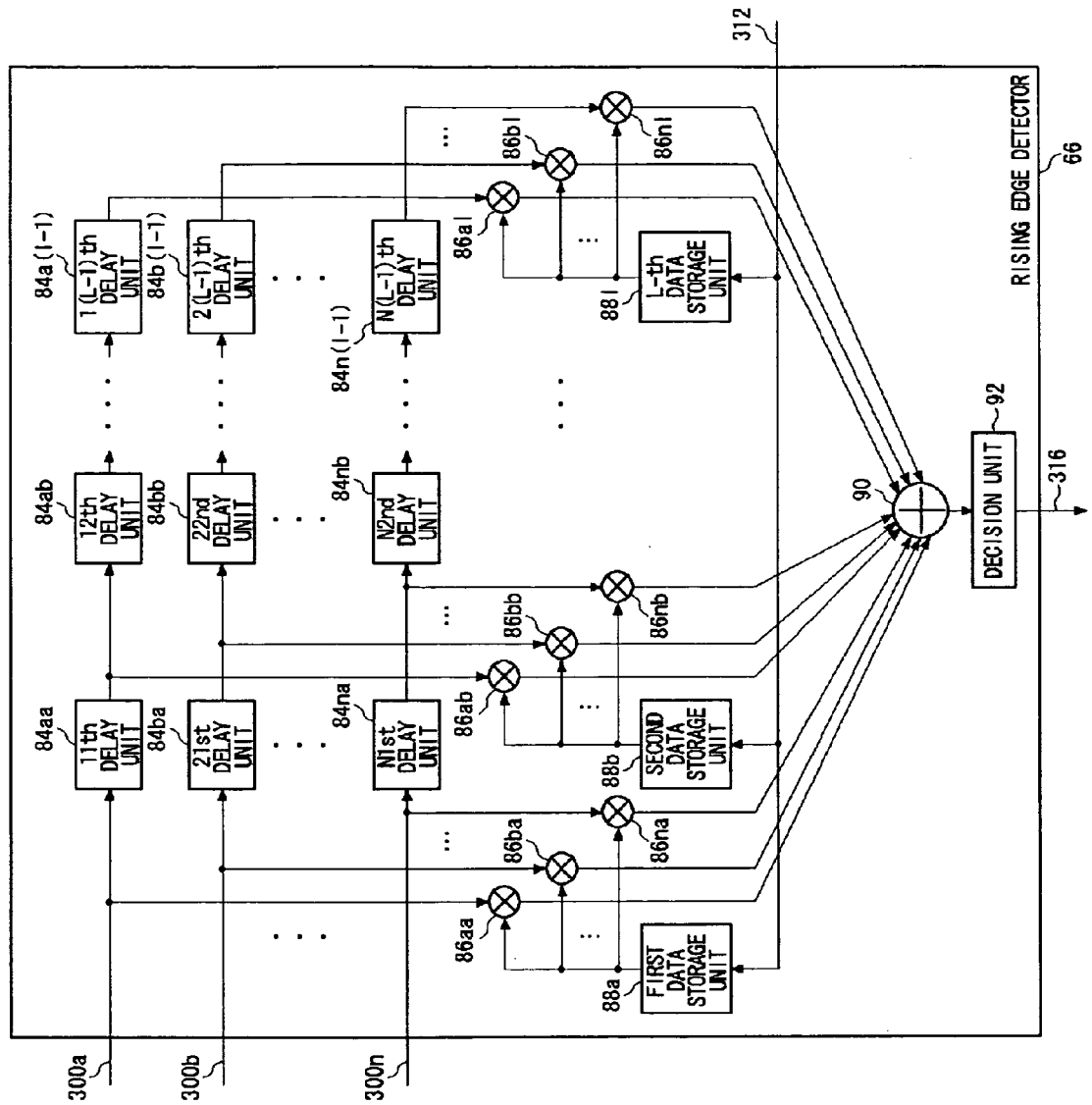
FIG. 8 shows a structure of the rising edge detector shown in FIG. 7.
Figure 9:
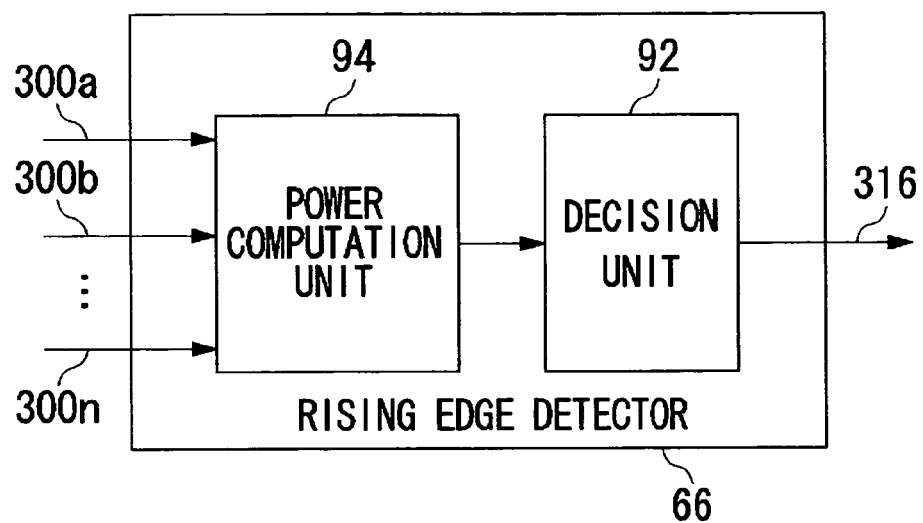
FIG. 9 shows another structure of the rising edge detector shown in FIG. 7.

FIGS. 8 and 9 show structures of a rising edge detector 66, which are each based on a matched filter and received power measuring device. The rising edge detector 66 shown in FIG. 8 includes an 11th delay unit 8*aa*, a 12th delay unit 84*ab*, . . . and a 1(L-1)th delay unit 84*a*(1-1), a 21st delay unit 84*ba*, a 22nd delay unit 84*bb*, . . . and a 2(L-1)th delay unit 84*b*(1-1), an N1st delay unit 84*na*, an N2nd delay unit 84*nb*, . . . and an N(L-1)th delay unit 84*n*(1-1), which are generically named delay units 84, an 11th multiplication unit 86*aa*, a 12th multiplication unit 86*ab*, . . . and a 1L-th multiplication unit 86*al*, a 21st multiplication unit 86*ba*, a 22nd multiplication unit 86*bb*, . . . and a 2L-th multiplication unit 86*bl*, . . . and an N1st multiplication unit 86*na*, an N2nd multiplication unit 86*nb*, . . . and an NL-th multiplication unit 86*nl*, which are generically named multiplication units 86, a first data storage unit 88*a*, a second data storage unit 88*b*, . . . and an L-th data storage unit 88*l*, which are generically named data storage units 88, an addition unit 90 and a decision unit 92.

The delay units 84 delay the inputted digital received signals 300 in parallel for respective antennas 22 for a correlation processing.

The data storage unit 88 stores the training signal 312 for detecting the head of a burst signal or a part thereof by one symbol each.

The multiplication units 86 multiply the delayed digital received signals 300 by the training signal 312, and the addition unit 90 further adds up the products.

Now, based on the result of the addition by the addition unit 90, the decision unit 92 detects the timing when the value reaches a maximum as the timing of the head of the burst signal and outputs it by an output control signal 316.

On the other hand, the rising edge detector 66 shown in FIG. 9 includes a power computing unit 94 and a decision unit 92. The power computing unit 94 computes received power of digital received signals 300 for a predetermined period and derives the electric power of signals received by all the antennas 22 by totaling it.

The decision unit 92 compares the thus obtained electric power of received signals with a predetermined condition, and, when it meets the condition, judges that the head of a burst signal has been detected. The condition may be that a period in which the received power is larger than a value of electric power set as a threshold value exceeds a predetermined period.

Figure 10:
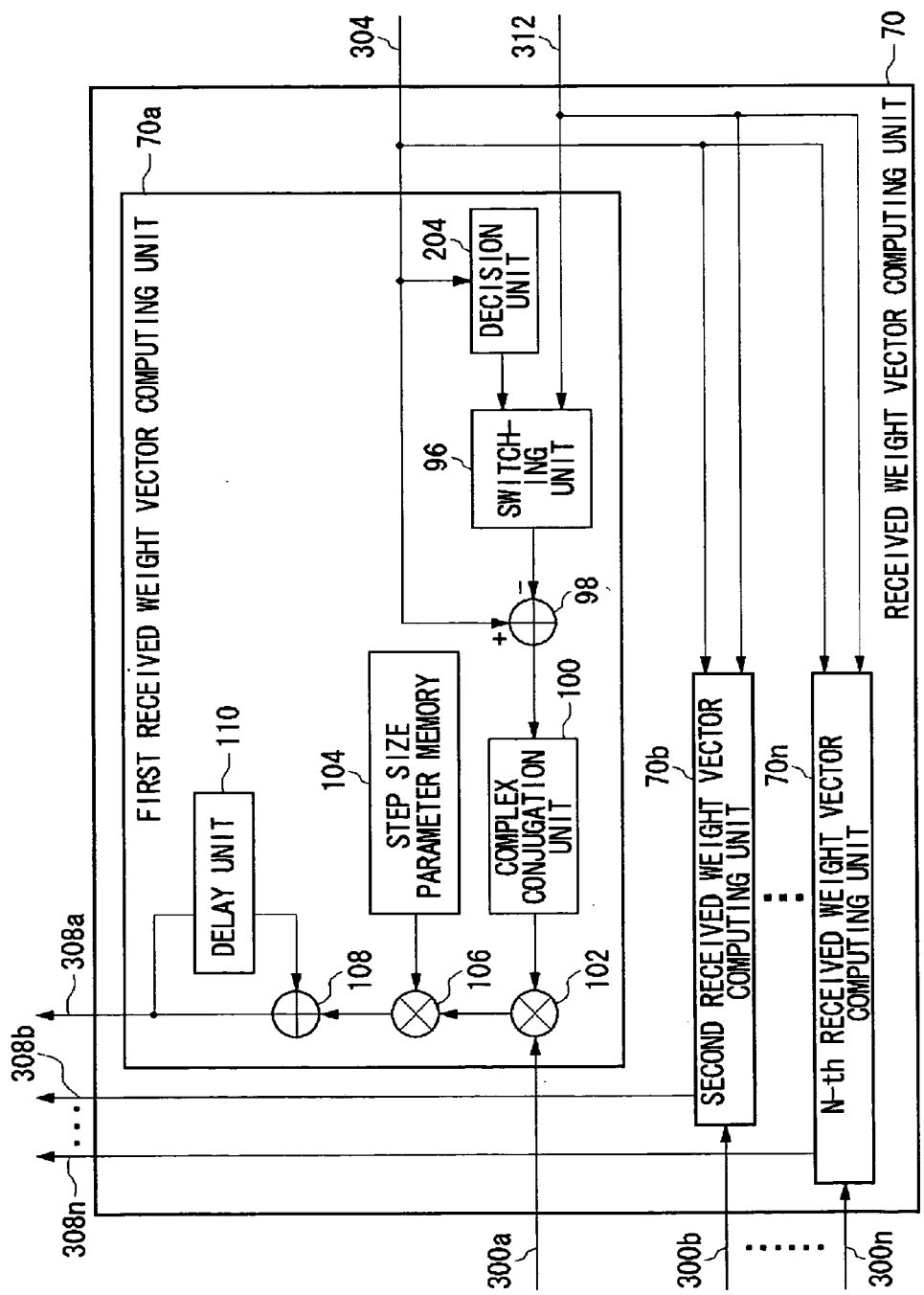
FIG. 10 shows a structure of a received weight vector computing unit shown in FIG. 7.

FIG. 10 shows a structure of a received weight vector computing unit 70 which executes the LMS algorithm. The received weight vector computing unit 70 includes a first received weight vector computing unit 70*a*, a second received weight vector computing unit 70*b*, . . . and an N-th received weight vector computing unit 70*n*. Further, the first received weight vector computing unit 70*a* includes a decision unit 204, a switching unit 96, an addition unit 98, a complex conjugation unit 100, a multiplication unit 102, a step size parameter memory 104, a multiplication unit 106, an addition unit 108 and a delay unit 110.

The decision unit 204 decides on a synthesis signal 304 by comparing it with a predetermined threshold value.

The switching unit 96 selects, as a reference signal for the LMS algorithm, a training signal 312 during a training period and a synthesis signal 304 thus decided on after the training.

The addition unit 98 computes the difference between the synthesis signal 304 and the reference signal, and outputs an error signal. The error signal is subjected to a complex conjugation conversion by the complex conjugation unit 100.

The multiplication unit 102 multiplies the error signal after the complex conjugation conversion by the first digital received signal 300*a*, and generates a first result of the multiplication.

The multiplication unit 106 multiplies the first result of multiplication by a step size parameter stored in the step size parameter memory 104, and generates a second result of multiplication the second result of multiplication is subjected to a feedback by the delay unit 110 and the addition unit 108 and then added to a new second result of multiplication. IN this manner, the result of addition updated successively by the LMS algorithm is outputted as a first received weight vector 308*a*.

Figure 11:
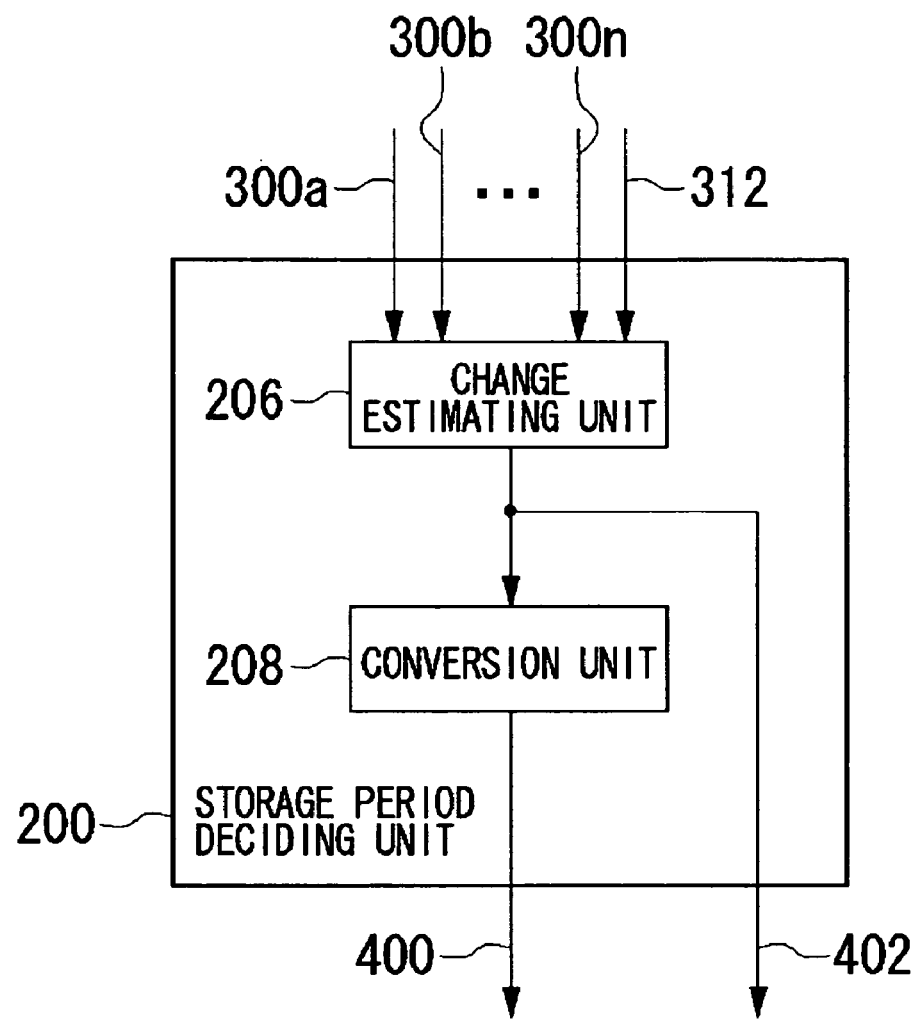
FIG. 11 shows a structure of the storage period deciding unit shown in FIG. 1.

FIG. 11 shows a structure of a storage period deciding unit 200. The storage period deciding unit 200 includes a change estimating unit 206 and a conversion unit 208.

The change estimating unit 206 estimates a Doppler frequency contained in digital received signals 300 from the digital received signals 300 and training signal 312, using a conventional technique. First, from the digital received signals 300 and training signal 312, a received weight vector H2 is computed by means of an adaptive algorithm such as the LMS algorithm, or a correlation processing. Then, a received weight vector already computed with a previous burst is expressed as H1. The correlation value C of thus expressed received weight vectors H1 and H2, which occur separately in time, is written by the following equation.

$$C = \frac{|H_1 H_2^H|}{|H_1||H_2|}$$

Here, H is the Hermitian conjugate. The change estimating unit 206, which is provided with a correspondence relationship between correlation values and Doppler frequencies, estimates a Doppler frequency from an applicable correspondence relationship and a correlation value calculated as shown above. This correspondence relationship is defined by the results of an experiment or the like. For example, the Doppler frequency is 0 Hz when the correlation value is in the range of 1 to 0.95 and is 10 Hz when it is in the range of 0.95 to 0.80. Furthermore, this Doppler frequency is converted into a movement velocity, which is outputted as a movement velocity signal 402.

The conversion unit 208, which is provided with a correspondence relationship between movement velocities and the storage period of received weight vectors 308, determines the storage period of the received weight vectors 308 from the inputted movement velocity 402, based on this correspondence relationship. IN this correspondence relationship, for example, the storage period is 10 seconds when the movement velocity is in the range of 0 km/h to 5 km/h. The storage period thus determined is outputted as a storage period indicating signal 400.

FIG. 12 shows a correspondence relationship between movement velocities and storage periods at the conversion unit 208 shown in FIG. 11. A table of this correspondence relationship is stored in a memory area inside or outside the conversion unit 208 and is referred to as needed. According to this correspondence relationship, the storage period is decided to be 8 seconds, for example, when the movement velocity is in the range of 5 km/h to 10 km/h or to be 6 seconds when it is in the range of 10 km/h to 15 km/h.

Figure 13:
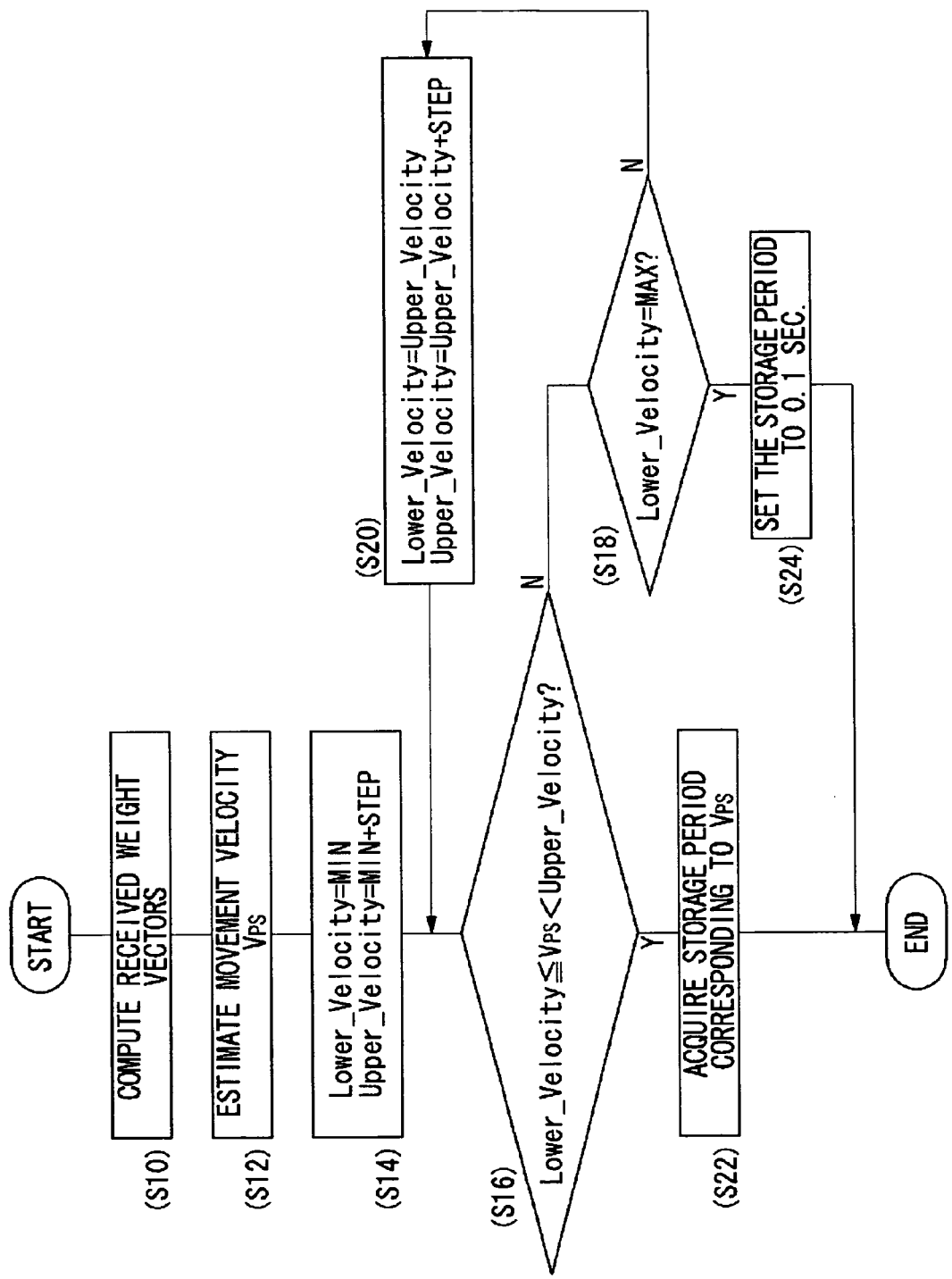
FIG. 13 shows a procedure for determining storage period at the storage period deciding unit shown in FIG. 11.

FIG. 13 shows a procedure for determining storage period at the storage period deciding unit 200 shown in FIG. 11. Here, various constants are defined relative to the correspondence table shown in FIG. 12 when the minimum movement velocity (hereinafter referred to as "MIN") is 0 km/h, the maximum movement velocity (hereinafter referred to as "MAX") is 35 km/h, and the magnitude of variation of movement velocity (hereinafter referred to as "STEP") is 5 km/h. The change estimating unit 206 of FIG. 11 computes received weight vectors by the LMS algorithm from digital received signals 300 and training signal 312 (S10). The change estimating unit 206 estimates a Doppler frequency from the received weight vectors and then converts the thus estimated Doppler frequency into a movement velocity (S12).

The conversion unit 208 sets a variable Lower_Velocity (hereinafter referred to as "LV") to MIN and a variable Upper_Velocity (hereinafter referred to as "UV") to MIN+STEP (S14). This corresponds to Line 1 in FIG. 12. When the movement velocity lies in the range between LV and UV (Y of S16), storage period corresponding thereto is acquired (S22). On the other hand, when the movement velocity is not in the range between LV and UV (N of S16) and moreover LV is not MAX (N of S18), either, UV is substituted for LV and UV is made equal to UV+STEP (S20). This corresponds to lowering the Line by one level in FIG. 12. These processings as described above are repeated to acquire storage period corresponding to movement velocity. However, when LV becomes MAX (Y of S18), which corresponds to Line 8 in FIG. 12, the storage period is determined to be 0.1 second (S24).

FIG. 14 shows storage contents of a storage period deciding unit 200 as determined by the processing of FIG. 13, which are rewritten successively and stored in a predetermined storage medium. PSIDs in FIG. 14 are numbers by which to identify terminal apparatuses 26. The PSID are required because a radio apparatus 10 is connected to a plurality of terminal apparatuses 26. The storage period deciding unit 200 stores movement velocities, storage periods and received weight vectors for the respective PSIDS. Storage contents for their respective PSIDs are stored for their respective storage periods with t1 to t10, which are each the time when a received signal is acquired, as the starting points. Upon completion of the storage periods, the corresponding received weight vectors are deleted from the storage period deciding unit 200.

An operation of the radio apparatus 10 implementing the above structure is as follows. Radio signals from a terminal apparatus 26 are first received by the antennas 22 and then converted into digital received signals 300 by the radio unit 12 and inputted to the signal processing unit 14. As the rising edge detector 66 detects the head timing of the digital received signals 300, the synthesizing unit 68 synthesizes the digital received signals 300 based on the received weight vectors 308 computed by the received weight vector computing unit 70. The digital received signals 300 are also inputted to the storage period deciding unit 200, where the storage periods for the received weight vectors 308 are determined based on the Doppler frequency estimated from the digital received signals 300. For the storage periods thus determined, the received weight storage unit 202 stores the received weight vectors 308. As a pre-seperation signal 306 to the applicable terminal apparatus 26 is inputted to the signal processing unit 14 from a network 24, the transmission weight vector computing unit 76 computes transmission weight vectors 310 based on the stored received weight vectors 308. The separation unit 74 separates the pre-separation signal 306, using the transmission weight vectors 310, into separate signals, which are translated into radio signals by the radio unit 12 and then outputted from their respective antennas 22.

According to the first embodiment, the storage periods of received weight vectors are determined by the magnitude of change in the propagation environment contained in the received signal, and therefore it is possible to make the storage periods of received weight vectors short when the change in the propagation environment is large and make them long when it is small. As a result, it is both possible to reduce memory area for storing received weight vectors and to improve the reliability of received weight vectors.

Second Embodiment

In a second embodiment of the present invention, as with the first embodiment, the storage periods of received weight vectors are determined according to the Doppler frequency contained in the received signal. Further in the second embodiment, the electric power of the received signal, in addition to the Doppler frequency, is referred to in the decision of the storage period. Generally speaking, the Doppler frequency estimated when the received power is small tends to be more influenced by errors or the like, with the result that the value can be less reliable. On the other hand, the Doppler frequency estimated when the received power is large tends to show a higher reliability of the value. Hence, in the second embodiment, even for the same value of the Doppler frequency, the storage period is made shorter if the received power is small and thus the margin for low reliability must be taken into consideration.

Figure 15:
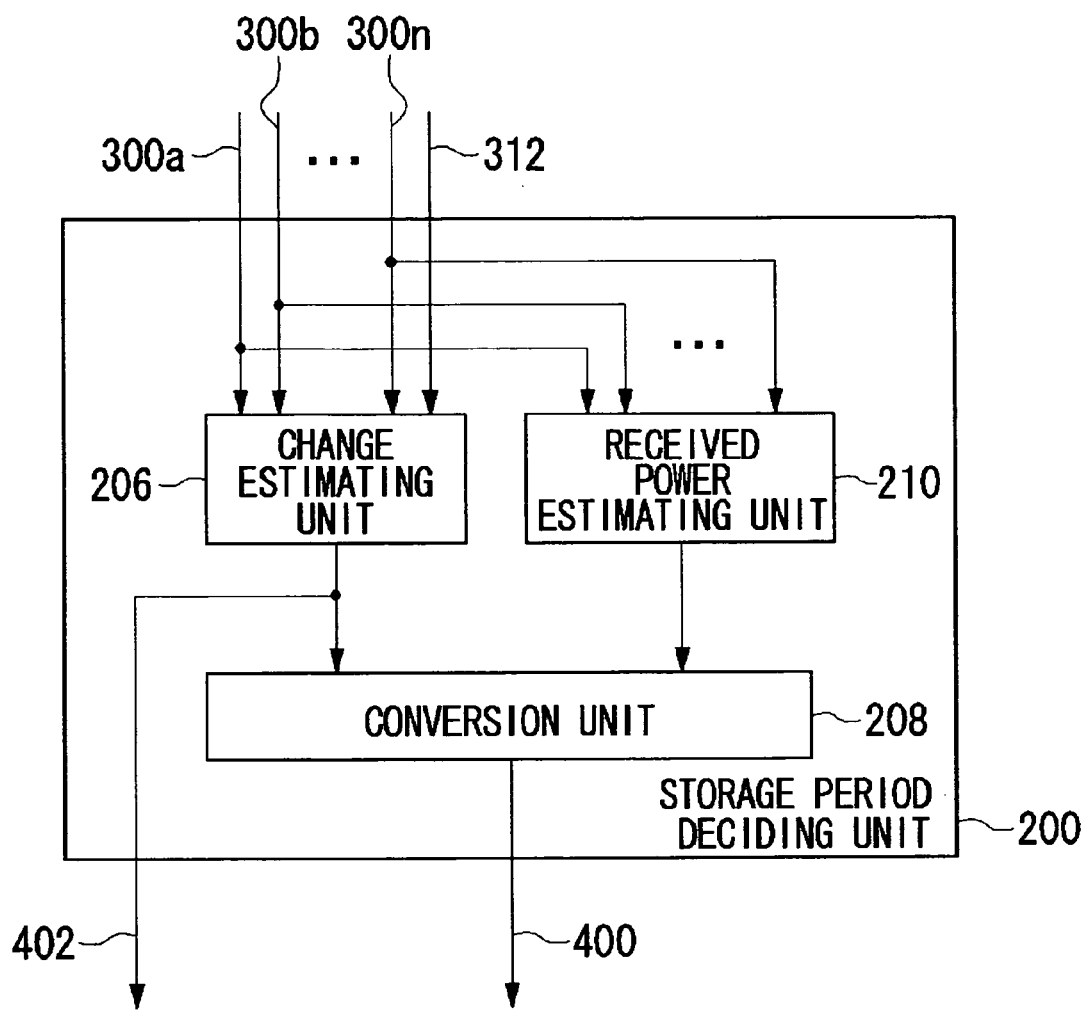
FIG. 15 shows a structure of a storage period deciding unit according to a second embodiment of the present invention.

FIG. 15 shows a structure of a storage period deciding unit 200. The storage period deciding unit 200 includes a change estimating unit 206, a conversion unit 208 and a received power estimating unit 210.

The received power estimating unit 210 computes a received power by summating digital received signals 300 for a predetermined period. Further, the received power estimating unit 210 classifies the calculated received power into the strong electric field for −40 dBm or above, the middle electric field for −40 dBm to −70 dBm and the weak electric field for −70 dBm or below and outputs the result of the classification.

The conversion unit 208, which is provided beforehand with a correspondence relationship between movement velocities, received powers and the storage periods of received weight vectors 308, determines the storage period of a received weight vector 308 from the inputted movement velocity signal 402 and the received power, based on this correspondence relationship. In this correspondence relationship, the storage period is 11 seconds, for example, if the movement velocity is in the range of 0 km/h to 5 km/h and, in addition the received power is classified as a strong electric field, but the storage period is 10 seconds if the received power is classified as a middle electric field instead. The storage period thus decided is outputted as a storage period indicating signal 400.

FIG. 16 shows a correspondence relationship between movement velocities, received powers and storage periods at the conversion unit 208 shown in FIG. 15. A table of this correspondence relationship is stored in a memory area inside or outside the conversion unit 208 and is referred to as needed. According to this correspondence relationship, the storage period is decided to be 9 seconds, for example, if the movement velocity is in the range of 5 km/h to 10 km/h and, in addition the received power is classified as a strong electric field, but will be 7.5 seconds if the received power is classified as a weak electric field instead.

Figure 17:
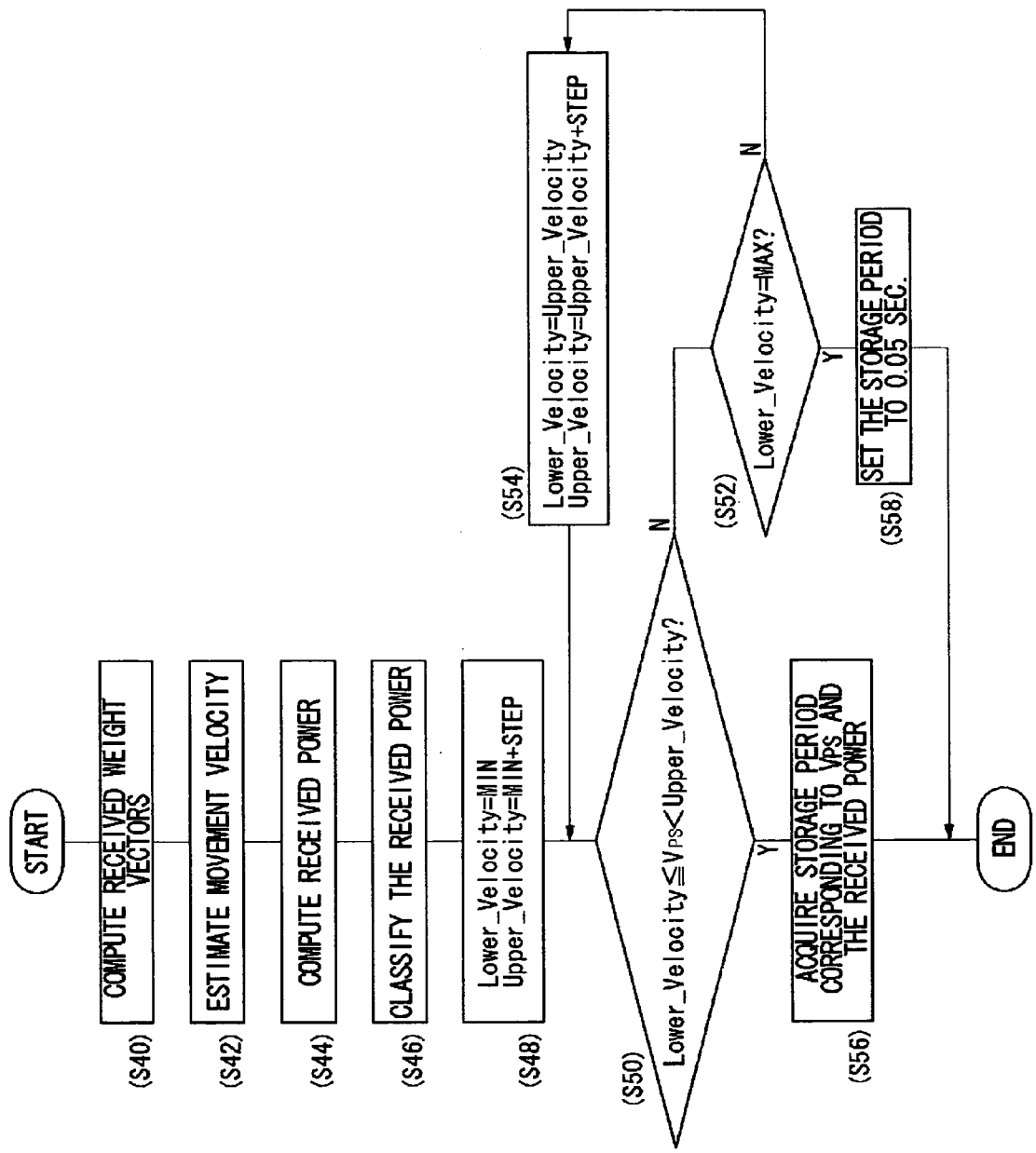
FIG. 17 shows a procedure for determining storage period at the storage period deciding unit shown in FIG. 15.

FIG. 17 shows a procedure for determining storage period at the storage period deciding unit 200 shown in FIG. 15. Here, constants and functions are defined the same way as in FIG. 13. The change estimating unit 206 in FIG. 15 estimates movement velocities (S40, S42). The received power estimating unit 210 computes received power from digital received signals 300 (S44) and classify the received power into one of the strong, middle and weak electric fields (S46). LV and UV are set the same way as in FIG. 13 (S48), and the range of LV to UV in which the movement velocity belongs is detected (S50 to S54). If such a range is detected, a storage period corresponding to the movement velocity and received power is acquired (S56). When LV becomes MAX (Y of S52), the storage period is determined to be 0.05 seconds (S58).

An operation of the radio apparatus 10 implementing the above structure is as follows. Radio signals from a terminal apparatus 26 are first received by the antennas 22 and then converted into digital received signals 300 by the radio unit 12 and inputted to the signal processing unit 14. As the rising edge detector 66 detects the head timing of the digital received signals 300, the synthesizing unit 68 synthesizes the digital received signals 300 based on the received weight vectors 308 computed by the received weight vector computing unit 70. The digital received signals 300 are also inputted to the storage period deciding unit 200, where the storage periods for the received weight vectors 308 are determined based on the Doppler frequency estimated from the digital received signals 300 and the received powers. For the storage periods thus determined, the received weight storage unit 202 stores the received weight vectors 308. As a pre-separation signal 306 to the applicable terminal apparatus 26 is inputted to the signal processing unit 14 from a network 24, the transmission weight vector computing unit 76 computes transmission weight vectors 310 based on the stored received weight vectors 308. The separation unit 74 separates the pre-separation signal 306, using the transmission weight vectors 310, into separate signals, which are translated into radio signals by the radio unit 12 and then outputted from their respective antennas 22.

According to the second embodiment, the storage periods of received weight vectors are determined based on the received power in addition to the Doppler frequency contained in the received signal, and therefore it is possible to add reliable information to the Doppler frequency, which serves as a reference in the decision of the storage period. As a result, the process for deciding the storage period can be optimized.

Third Embodiment

In a third embodiment of the present invention the storage periods of received weight vectors are determined as with the first and second embodiments, but the received weight vectors are determined according to the size of free area of memory for recording and storage, unlike the first and second embodiments in which they are determined from the received signals. That is, when the free area of memory is large, the storage periods of received weight vectors are set longer, because there is only a low possibility of the memory capacity exceeded by stored received weight vectors, but when the free area is small, the storage periods are set shorter to ensure the memory capacity.

Figures 18, 19:
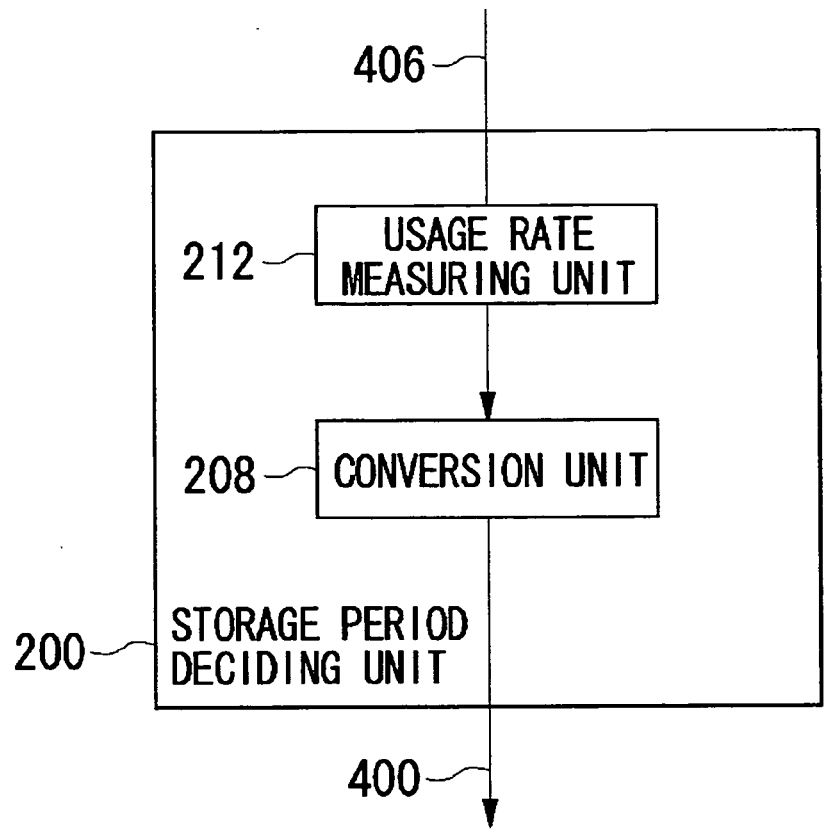
FIG. 18 shows a structure of a storage period deciding unit according to a third embodiment of the present invention.
FIG. 19 shows a correspondence relationship between memory usage rates and storage periods at the conversion unit shown in FIG. 18.

FIG. 18 shows a structure of a storage period deciding unit 200. The storage period deciding unit 200 includes a usage rate measuring unit 212 and a conversion unit 208.

The usage rate measuring unit 212 measures the usage rate of memory storing received weight vectors and the like at the received weight storage unit 202, using a usage rate signal 406 outputted from the received weight storage unit 202. The measurement of memory usage rate may be executed by the received weight storage unit 202 under the instructions from the usage rate measuring unit 212 or may be accomplished by calculation based on address information used by memory that is contained in the usage rate signal 406.

The conversion unit 208, which is provided beforehand with a correspondence relationship between memory usage rates and the storage periods of received weight vectors 308, determines the storage period of each received weight vector 308 from the memory usage rate calculated by the usage rate measuring unit 212 and this correspondence relationship. IN this correspondence relationship, for example, the storage period is 1200 seconds when the usage rate is in the range of 0% to 20%. The storage period thus decided is outputted as a storage period indicating signal 400.

FIG. 19 shows a correspondence relationship between memory usage rates and storage periods at the conversion unit 208 shown in FIG. 18. A table of this correspondence relationship is stored in a memory area of the conversion unit 208 and is referred to as needed. According to this correspondence relationship, the storage period is decided to be 600 seconds, for example, when the memory usage rate is in the range of 20% to 40% or to be 5 seconds when it is in the range of 60% to 80%.

Figure 20:
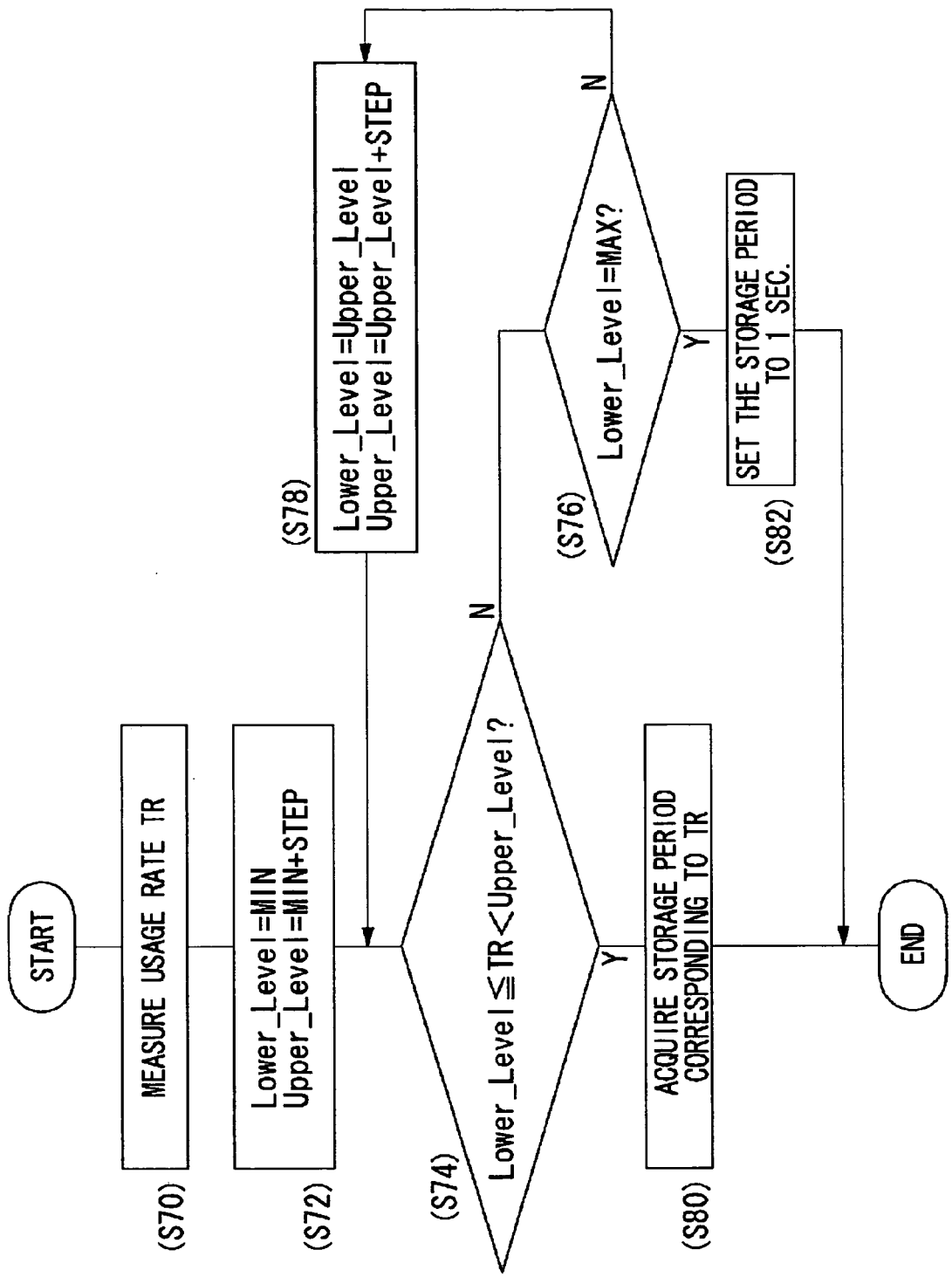
FIG. 20 shows a procedure for determining storage period at the storage period deciding unit shown in FIG. 18.

FIG. 20 shows a procedure for determining storage period at the storage period deciding unit 200 shown in FIG. 18. Here, constants are so defined relative to the correspondence table shown in FIG. 19 that the minimum value of memory usage rate (hereinafter referred to as "MIN") is 0%, the maximum value of memory usage rate (hereinafter referred to as "MAX") is 80%, and the variation width of memory usage rate (hereinafter referred to as "STEP") is 20%. The usage rate measuring unit 212 of FIG. 18 measures a memory usage rate TR, using the usage rate signal 406 (S70). The conversion unit 208 sets a function Lower_Level (hereinafter referred to as "LL") as MIN and a function Upper_Level (hereinafter referred to as "UL") as MIN+ STEP (S72). This corresponds to Line 1 in FIG. 12. When the memory usage rate TR is in the range between LL and UL (Y of S74), a storage period corresponding thereto is acquired (S80). On the other hand, when the movement velocity memory usage rate TR is not in the range between LL and UL (N of S74) and moreover LL is not MAX (N of S76), UL is substituted for LL and UL is made equal to UL+STEP (S78). This corresponds to lowering the Line by one level in FIG. 19. These processings as described above are repeated to acquire storage periods corresponding to memory usage rates TR. However, when LL becomes MAX (Y of S76), which corresponds to Line 5 in FIG. 12, the storage period is determined to be 1 second (S82).

An operation of the radio apparatus 10 implementing the above structure is as follows. Radio signals from a terminal apparatus 26 is first received by the antennas 22 and then converted into digital received signals 300 by the radio unit 12 and inputted to the signal processing unit 14. As the rising edge detector 66 detects the head timing of the digital received signals 300, the synthesizing unit 68 synthesizes the digital received signals 300 based on the received weight vectors 308 computed by the received weight vector computing unit 70. The usage rate measuring unit 212 measures the memory usage rates of the received weight storage unit 202 and determines the storage periods of the received weight vectors 308 according to the measurement results. For the storage periods thus determined, the received weight storage unit 202 stores the received weight vectors 308. As a pre-separation signal 306 to the applicable terminal apparatus 26 is inputted to the signal processing unit 14 from a network 24, the transmission weight vector computing unit 76 computes transmission weight vectors 310 based on the stored received weight vectors 308. The separation unit 74 separates the pre-separation signal 306, using the transmission weight vectors 310, into separate signals, which are translated into radio signals by the radio unit 12 and then outputted from their respective antennas 22.

According to the third embodiment, the storage periods of received weight vectors are determined by the size of free area of memory storing the received weight vectors. Hence, when the free area is large, the received weight vectors can be stored for long periods, and when it is small, the storage periods may be made shorter to ensure the use of memory capacity without the excess usage thereof.

The present invention has been described based on the embodiments which are only exemplary. It is understood by those skilled in the art that there exist other various modifications to the combination of each component and process described above and that such modifications are encompassed by the scope of the present invention.

In the first to third embodiments, the received weight vector computing unit 70 uses adaptive algorithms to estimate received weight vectors 308. However, the received weight vector computing unit 70 may estimate received weight vectors 308 by any other processing. For example, received response vectors may be estimated by a correlation processing so as to be taken as such. Moreover, an arrival direction estimation using an algorithm, such as MUSIC (MUltiple SIgnal Classification), which is different from the above-mentioned adaptive algorithm or correlation processing, may be executed. This modified example may realize a more detailed distinction between desired waves and undesired waves. Thus, the modified example or other modifications may also be acceptable as long as they can estimate values by which a plurality of received signals can be separated in the signal processing with an adaptive array antenna.

In the first to third embodiments, the control unit 20 uses the multiple access technology of CSMA. However, the multiple access technology to be applied may be not only the CSMA but also TDMA and CDMA for instance. Particularly when dynamic slot assign is done in these multiple access technologies, the present invention proves valid because they do not define transmission timing of the radio apparatus 10. That is, it is acceptable if the received weight vectors stored in the received weight storage unit 202 can be deleted at any of available timings.

In the first to third embodiments, the signal processing unit 14 uses estimated received weight vectors 308 for synthesis processing with an adaptive array antenna. However, received weight vectors 308 may be used for a device other than an adaptive array antenna, for example, an adaptive equalizer. In such a case, the synthesizing unit 68 may have a structure having a delay element therein as in an FIR filter. Moreover, the same advantageous effect as in the pre-equalization is obtained by the use of received weight vectors 308 stored by the received weight storage unit 202 at the time of transmission the present embodiments may further be applied to synchronous detection circuits. That is, the present embodiments and the modified examples are useful if they are used for circuits in which the propagation environment must be reflected some way or other.

In the first and second embodiments, the storage period deciding unit 200 estimates storage periods by first computing correlation values and then estimating the Doppler frequencies from them and further converting the computed correlation values into movement velocities. However, other procedures may also be employed; for example, the storage periods may be directly estimated from the correlation values. In so doing, it is speculated that the Doppler frequencies may be reflected in the correlation values. IN this modified example, processing steps can be reduced. That is, such a variation is permitted if the storage period is determined from the degree of change in the propagation environment.

In the second environment, the received power estimating unit 210 estimates the electric power of received signals from digital received signals 300. However, the received power of the received signals may also be estimated by other methods; for example, the RSSI value outputted by AGC 46 may be used. That is, any modification may be valid so long as the values that reflect the size of received power are used.

Although the present invention has been described by way of exemplary embodiments, it should be understood that many changes and substitutions may further be made by those skilled in the art without departing from the scope of the present invention which is defined by the appended claims.

What is claimed is:

1. A method of storing received response characteristics, the method including the steps of:
   inputting a received signal from a terminal apparatus;
   estimating, from the inputted received signal, a received response characteristic of the terminal apparatus;
   estimating, from the inputted received signal, the degree of change in a propagation environment between the terminal apparatus and a radio apparatus;
   determining a storage period of the estimated received response characteristic according to the estimated degree of change;
   storing, after the storage period is determined, the estimated received response characteristic for the determined storage; and
   deleting the estimated received response characteristic stored, upon completion of the storage period, wherein the determining step comprises shortening the storage period as the degree of change becomes greater.

2. A method according to claim 1, wherein said determining step is such that movement velocity of the terminal apparatus is estimated, from the inputted received signal, as estimating the degree of change in a propagation environment.

3. A method according to claim 2, wherein said determining step further includes estimating electric power of the inputted received signal wherein the storage period for the substantially same degree of change is made longer as the electric power becomes larger.

4. A method according to claim 1, wherein said determining step is such that a Doppler frequency contained in the received signal is estimated, from the inputted received signal, as estimating the degree of change in a propagation environment.

5. A method according to claim 4, wherein said determining step further includes estimating electric power of the inputted received signal wherein the storage period for the substantially same degree of change is made longer as the electric power becomes larger.

6. A method according to claim 1, wherein said determining step further includes estimating electric, power of the inputted received signal wherein the storage period for the substantially same degree of change is made longer as the electric power becomes larger.

7. A program executable by a computer, embedded in a computer readable storage medium, the program, when executed, causing the computer to perform the steps of:
   inputting a received signal from a terminal apparatus;
   estimating, from the inputted received signal, a received response characteristic of the terminal apparatus;

estimating, from the inputted received signal, the degree of change in a propagation environment between the terminal apparatus and a radio apparatus;

determining a storage period of the estimated received response characteristic according to the estimated degree of change;

storing, after the storage period is determined, the estimated received response characteristic for the determined storage period; and deleting the estimated received response characteristic stored, upon completion of the storage period, wherein the determining step comprises shortening the storage period as the degree of change becomes greater.

8. A program according to claim 7, wherein said determining step is such that movement velocity of the terminal apparatus is estimated, from the inputted received signal, as estimating the degree of change in a propagation environment.

9. A program according to claim 8, wherein said determining step further includes estimating electric power of the inputted received signal wherein the storage period for the substantially same degree of change is made longer as the electric power becomes larger.

10. A program according to claim 7, wherein said determining step is such that a Doppler frequency contained in the received signal is estimated, from the inputted received signal, as estimating the degree of change in a propagation environment.

11. A program according to claim 10, wherein said determining step further includes estimating electric power of the inputted received signal wherein the storage period for the substantially same degree of change is made longer as the electric power becomes larger.

12. A program according to claim 7, wherein said determining step further includes estimating electric power of the inputted received signal wherein the storage period for the substantially same degree of change is made longer as the electric power becomes larger.

13. A radio apparatus, including:

an input unit which inputs a received signal from a terminal apparatus;

a received response characteristics estimating unit which estimates, from the inputted received signal, a received response characteristic of the terminal apparatus;

a storage period determining unit which estimates, from the inputted received signal, the degree of change in a propagation environment between the terminal apparatus and a radio apparatus, and determines a storage period of the estimated received response characteristic according to the estimated degree of change;

a received response characteristics storage unit which stores, after the storage period is determined, the estimated received response characteristics for the determined storage period;

a transmission response characteristics estimating unit which estimates a transmission response characteristic from the received response characteristic stored by said received response characteristic storage unit; and an output unit which operates a signal to be transmitted to the terminal apparatus on the transmission response characteristic estimated by said transmission response characteristics estimating unit, so as to be outputted, wherein the storage period determining unit shortens the storage period as the degree of change becomes greater, and the received response characteristics storage unit deletes the estimated received response characteristic stored, upon completion of the storage period.

14. A radio apparatus according to claim 13, wherein said storage period determining unit estimates movement velocity of the terminal apparatus, from the inputted received signal, as estimating the degree of change in a propagation environment.

15. A radio apparatus according to claim 14, wherein said storage period determining unit further estimates electric power of the inputted received signal and determines in a manner such that the storage period for the substantially same degree of change is made longer as the electric power becomes larger.

16. A radio apparatus according to claim 13, wherein said storage period determining unit estimates, from the inputted received signal, a Doppler frequency contained in the received signal as estimating the degree of change in a propagation environment.

17. A radio apparatus according to claim 16, wherein said storage period determining unit further estimates electric power of the inputted received signal and determines in a manner such that the storage period for the substantially same degree of change is made longer as the electric power becomes larger.

18. A radio apparatus according to claim 13, wherein said storage period determining unit further estimates electric power of the inputted received signal and determines in a manner such that the storage period for the substantially same degree of change is made longer as the electric power becomes larger.

* * * * *